May 16, 1939.  A. G. DEAN  2,158,783
SUPPORT
Filed Aug. 28, 1937   2 Sheets-Sheet 1
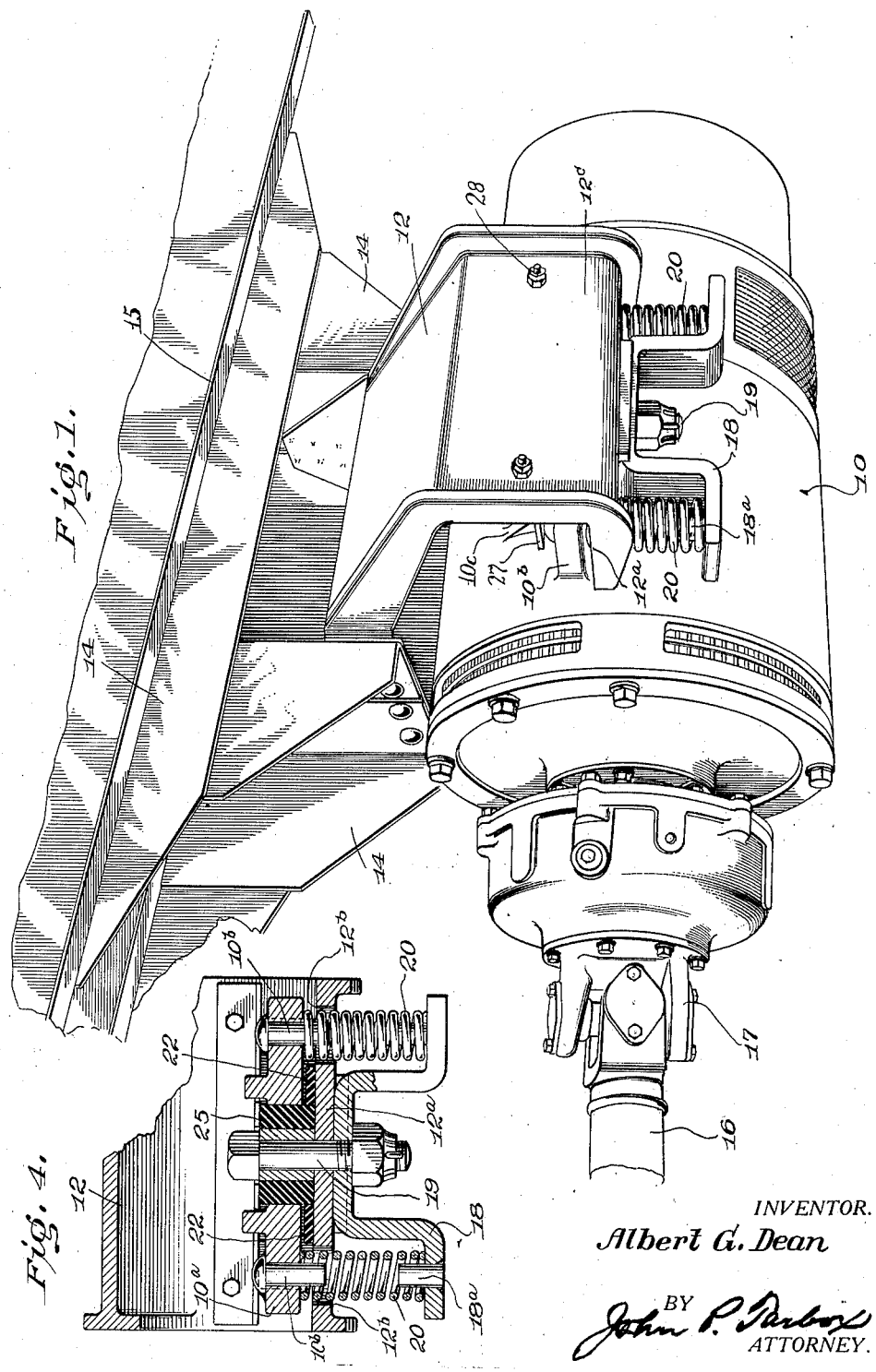
INVENTOR.
Albert G. Dean
BY
ATTORNEY.

May 16, 1939.  A. G. DEAN  2,158,783
SUPPORT
Filed Aug. 28, 1937  2 Sheets-Sheet 2
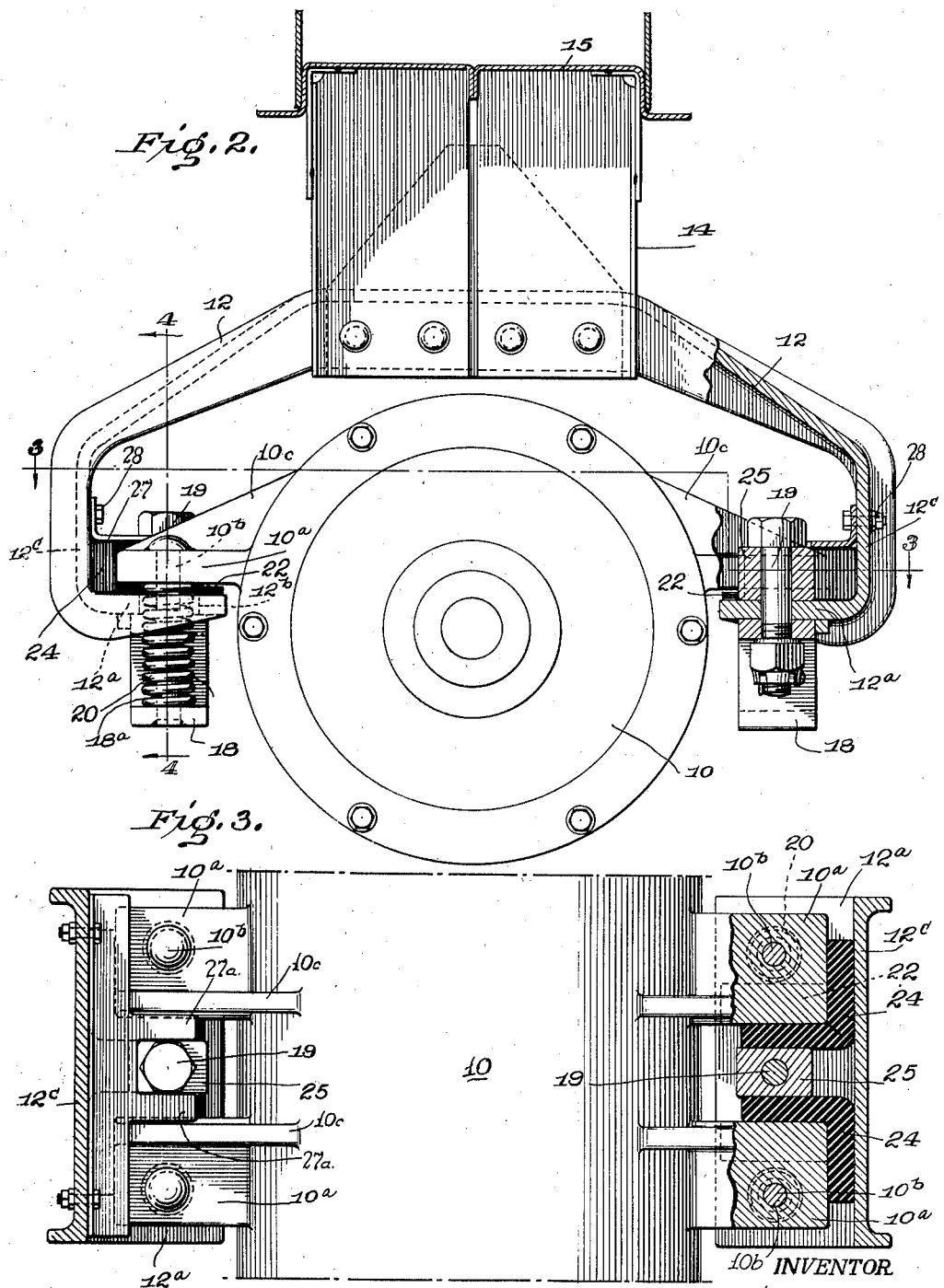
INVENTOR
Albert G. Dean
BY John P. Tarbox
ATTORNEY.

Patented May 16, 1939

2,158,783

UNITED STATES PATENT OFFICE 2,158,783

SUPPORT

Albert G. Dean, Narberth, Pa., assignor to Edward G. Budd Manufacturing Company, Philadelphia, Pa., a corporation of Pennsylvania Application August 28, 1937, Serial No. 161,368

8 Claims. (Cl. 248—21)

This invention relates to improvements in a generator mounting and more particularly one adapted for rail car construction.

One of the principal objects of this invention is to provide an improved generator mounting which will permit relatively free vertical movements of the generator but will restrain lateral and longitudinal movements so that the supporting structure is entirely free of generator vibrations.

Another object of the invention is to provide an especially free mounting for a generator and yet one which is safe and free from any possible breakage.

A still further object of the invention is to provide a resilient spring mounting for a generator with the generator supports substantially cushioned in rubber with a normally free vertical movement and a normally restrained lateral and longitudinal movement.

Further objects and advantages of my invention will appear from the following description of a preferred form of embodiment thereof taken in connection with the attached drawings illustractive thereof, in which Fig. 1 is a perspective view of a generator and its mounting to an underpart of a car body;

Fig. 2 is a transverse vertical section with parts broken away showing the generator mounting;

Fig. 3 is a horizontal section with parts of the generator in plan and parts of the generator broken away to show the details of its supporting structure;

Fig. 4 is a partial vertical longitudinal section showing the details of the generator support.

In the mounting of generators under rail car bodies it has been found that there is a substantial vibration transmitted more especially when the generator goes through its critical speed. It has been found substantially impossible to eliminate the vibration at such times and the transmission of such vibrations is of considerable moment and highly objectionable in the car body.

In accordance with one preferred form of embodiment of my invention I have shown a generator generally indicated at 10 which is adapted to be supported by a hanger 12 from brackets 14 attached in a desired manner to the car body. As shown in Fig. 2, the part of the car body to which the generator is attached may be the center sill 15 or any other suitable part.

A generator of this character is driven as by a shaft 16 through a suitable universal 17 from the truck axles (not shown) and is adapted to supply the necessary electricity for the particular car. With air conditioning equipment these generators are frequently of 20 kw. size and may weigh in the neighborhood of 1200 pounds. It is highly essential that the generator be safely mounted for the breakage of any part which would allow the generator to drop would cause disastrous results and might derail the train. Safety and resilience of mounting are the prime requisites to be considered.

I have found that I can eliminate vibration effect by providing an especially resilient support permitting a vertical movement which is substantially free and unrestrained. For this purpose I provide a depending bracket 18 which may be conveniently bolted to the hanger ledge 12a by the bolt 19. The hanger ledges 12a are provided with apertures 12b through which springs 20 pass, such springs being centered on the flanges of the bracket 18 by the centering studs 18a. The other ends of the springs rest under the generator legs 10a and are centered by centering pins 10b.

It will thus be seen that the load of the generator is normally carried through the bracket 18 and the bolt 19 from the hanger ledge 12a and normally this is satisfactory and can be expected to sustain the generator under all ordinary operating conditions because no impact strains are transmitted through the hanger ledge 12a and through the bolt 19 into the generator as the springs 20 intervene. Similarly, no vibrations are transmitted from the generator into the hanger 12 for the same reason. The bolt 19 can never be under a stress greater than can be resisted by the springs 20 and, being under no fatiguing loads, it is of very great durability.

With the springs projected through the hanger ledge 12a from the bracket 18 below, much longer springs can be used so that the desired characteristics of strength and frequency can be obtained. As shown, the springs are in the loaded position and it will appear that the generator is freely resting on the springs and movement in a vertical plane will not be otherwise restrained. The limit to an abnormal movement, however, is the top of the hanger 12, and the cushion blocks 22 on the hanger ledges 12a.

For added safety in case of any destruction of the springs, the hanger ledges 12a which extend inwardly below the generator legs 10a, have the rubber cushions 22 which are thus between the generator legs 10a and the hanger ledge 12a. As heretofore described, they do not normally support the generator which is normally carried by the springs 20, but they will serve as a temporary cushion for the generator and prevent metal to metal contact. There is no possibility of the generator dropping more than the small fraction of an inch onto this support.

Longitudinal and lateral movements of the generator are normally cushioned by additional rubber blocks 24 of angular cross section as shown in Fig. 3. These rest between the ends of the generator legs 10a and the wall 12c of the hanger 12. The blocks also extend between the spacer 25 surrounding the bolt 19 and the insides of the generator legs 10a thereby totally eliminating any possible metal to metal contact or substantial movement.

If desired, a holding angle 27, attached to the sides of the hanger 12, as by bolts 28, and overlapping the cushion blocks 24, may be used. This will hold the blocks in place during operation. It may have extension fingers 27a for maintaining adequate contact on the rubber blocks, such extensions projecting alongside the generator webs 10c.

It will thus be seen that great vertical flexibility for the generator is allowed while only small longitudinal and lateral flexibility is permitted. This is of particular benefit with rail car generators which are often subject to car impact loads. Also, with belt driven generators, belt tension applied to the generator must be resisted by the longitudinal force resisting cushions. It is securely and safely mounted against abnormal shocks regardless of direction, and the safety ledge prevents complete failure. It is of course also to be noted that the hanger is adapted for any type of rotary structure, and that the description herein is illustrative of one preferred form of embodiment of the invention. It is to be noted, however, that with light weight car bodies, the vibration loads would normally be greater for the same size generator than in normal heavy construction. I am aware that other modifications may be made thereto and I therefore desire a broad interpretation of my invention within the scope and spirit of the description herein and of the claims appended hereinafter.

I claim:

1. A support for a rotary device having projecting legs which comprises, a depending hanger having ledges extending inwardly toward each other under said legs, means secured to said hanger ledges and forming spring seats spaced below said ledges, and springs supported from said spring seats and normally supporting the legs of said rotary device in spaced relation above said ledges.

2. A support for a rotary device having projecting legs which comprises, a hanger having ledges extending under said legs, means secured to said hanger ledges and forming spring seats spaced below said ledges, and springs supported from said spring seats and normally supporting the legs of said rotary device, said springs extending through said hanger ledges.

3. A support for a rotary device having projecting legs which comprises, a hanger having ledges extending under said legs, means secured to said hanger ledges and forming spring seats spaced below said ledges, and springs supported from said spring seats, and normally supporting the legs of said rotary device spaced above said ledges, and rubber cushions on said hanger ledge arranged to support the legs of said rotary device in case of spring failure.

4. In combination with a vehicle body of the class described, a vibration-free support for a rotary device which comprises, a hanger suspended from said vehicle body and having ledges extending toward each other and under said rotary device, spring means normally supporting said rotary device spaced from said hanger ledges, and a second resilient means to support said rotary device in case of failure of said springs.

5. A generator suspension for a rail car generator having supporting legs, a hanger having portions extending under said legs, a bracket projecting below each of said ledges and detachably secured thereto, and spring means seated on said brackets and normally supporting said generator out of contact with said ledges.

6. A generator suspension for a rail car generator having supporting legs, a hanger having portions extending under said legs, a bracket projecting below each of said ledges and detachably secured thereto, and spring means seated on said brackets and normally supporting said generator out of contact with said ledges, and means to cushion said generator against lateral and longitudinal movement.

7. A generator suspension for a rail car generator having supporting legs, a hanger having portions extending under said legs, a bracket projecting below each of said ledges and detachably secured thereto, and spring means seated on said brackets and normally supporting said generator out of contact with said ledges, and normally inactive cushion safety means between the ledge and the hanger.

8. In combination with a rail car, a hanger extending below the underframe thereof and having inturned ledges, a flanged bracket secured to each of said ledges and forming a spring seat, said ledges having apertures therein, springs seated on said brackets and extending through said apertures, said ledges serving as a cage for said springs, and a rotary device having supporting portions supported by said resilient means above the top of said hanger ledges.

ALBERT G. DEAN.